3,558,611
NOVEL STILBENE DERIVATIVES
Fritz Fleck, Bottmingen, Switzerland, assignor to Sandoz Ltd., Basel, Switzerland, a corporation of Switzerland
No Drawing. Filed Feb. 19, 1968, Ser. No. 706,613
Int. Cl. C07d 55/24
U.S. Cl. 260—240                                                   3 Claims

ABSTRACT OF THE DISCLOSURE

Novel asymmetric bis-triazinylamino-stilbenes of the Formula I

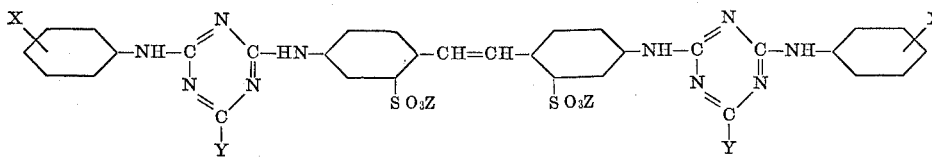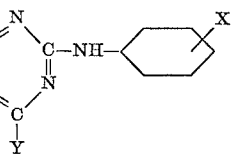

in which
one X signifies a hydrogen atom, and
the other X signifies a chlorine atom in the 2-, 3- or 4-position,
Y signifies a methylamino, dimethylamino, β-hydroxyethylamino, N-methyl - N - β - hydroxyethylamino or morpholino radical, and
Z signifies a cation forming atom or group, are produced and their use in the brightening of textiles, e.g. polyamide fibres, cotton, linen, regenerated cellulose, is exemplified, whereby undyed or white goods become brightened and goods dyed in delicate pastel shades become more brilliant.

SUMMARY OF THE INVENTION

The present invention provides asymmetric bistriazinylamino-stilbenes of the Formula I

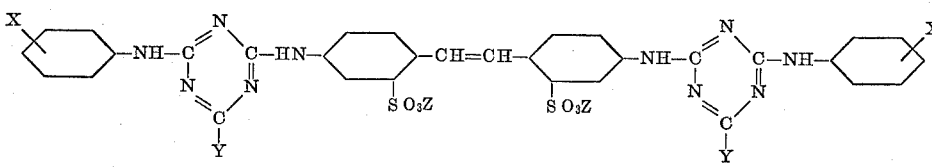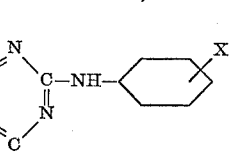

in which
one X signifies a hydrogen atom, and
the other X signifies a chlorine atom in the 2-, 3-, or 4-position (preferably the 3- or 4-position),
Y signifies a methylamino, dimethylamino, β-hydroxyethylamino, N-methyl - N - β - hydroxyethylamino or morpholino radical, and
Z signifies a cation forming atom or group;

these compounds may be used as brighteners. It is seen that the compounds I are asymmetric since one terminal benzene radical is unsubstituted, whereas the other one is substituted with a chlorine atom.

It is stressed that the nature of Z in the Formula I does not determine the brightening power of the compounds I and hence all organic and inorganic atoms or radicals capable of forming cations are included within the scope of the present invention.

The asymmetric bis-triazinylaminostilbenes of the Formula I may be used as brightening agents, e.g. for textile materials, alone or also in admixture with symmetrical bis-triazinylaminostilbenes which correspond to the Formula I, but wherein both symbols X represent hydrogen or chlorine and/or with brighteners of different chemical constitution but similar adsorption power, e.g. so as to produce pure white fluorescence.

The invention also provides a process for the production of bis-triazinylaminostilbenes of the Formula I or mixtures containing these bis-triazinylaminostilbenes, which process is characterized in that a cyanuric halide, preferably cyanuric chloride or -bromide, is reacted in any desired order with such amounts of (a) 4,4'-diaminostilbene-2,2'-disulphonic acid or a salt thereof,
(b) methylamine, dimethylamine, β-hydroxyethylamine, N-methyl-N-β-hydroxyethylamine or morpholine,
(c) aminobenzene, and
(d) chloroaminobenzene, that predominantly a compound of Formula I results. Working is advantageously effected in molar proportions, i.e. there are used suitably per mol of 4,4'-diaminostilbene-2,2'-disulphonic acid or salt thereof, 2 mols of cyanuric halide (e.g. cyanuric chloride or -bromide), 2 mols of methylamine, dimethylamine, β-hydroxyethylamine, N-methyl-N-β-hydroxyethylamine or morpholine and 2 mols of a mixture of aminobenzene and chloroaminobenzene in the proportion of from 1:2 to 2:1, preferably in the proportion 1:1.

A variant of this process is characterized in that in a first reaction sequence 1 mol of cyanuric halide, preferably cyanuric chloride or -bromide, is reacted in any desired order with (a) 1 mol of 4-amino-4'-nitrostilbene - 2,2' - disulphonic acid or a salt thereof,
(b) 1 mol of methylamine, dimethylamine, β-hydroxyethylamine or N-methyl-N - β - hydroxyethylamine or morpholine, and
(c) 1 mol of aminobenzene or chloroaminobenzene, the nitro group in the resulting product is reduced and in a second reaction sequence 1 mol of cyanuric halide, preferably cyanuric chloride or -bromide, in any desired order is reacted with (a) 1 mol of the resulting amino compound,
(b) 1 mol of methylamine, dimethylamine, β-hydroxyethylamine or N-methyl-N - β - hydroxyethylamine or morpholine, and
(c) 1 mol of aminobenzene or chloroaminobenzene, chloroaminobenzene being used in the second reaction sequence when aminobenzene is used in the first reaction sequence and vice versa.

In the process of producing the compounds of the Formula I it is advantageous for cyanuric chloride or cyanuric bromide to be suspended in water with the aid of an organic solvent, e.g. acetone, and to allow reaction to proceed at a temperature of from 0° to 20° C., preferably from 0° to 5° C., with the first amine, at a temperature of from 20° to 50° C. with the second amine, and at a temperature of from 70° to 100° C. with the third amine, and to neutralize the resulting hydrogen chloride or bromide with an acid binding agent, preferably an alkali metal hydroxide, -carbonate or -acetate or with one of the starting material amines. When the starting material amine is used in the form of a salt thereof, it is suitable to use more alkali metal hydroxide or -carbonate in order to maintain the desired pH value. In this way there is obtained at the end of the first reaction sequence a 4-(4″-6″-disubstituted-1″,3″,5″ - triazinyl-2″-amino)-4′-nitrostilbene-2,2′-disulphonic acid, in which the nitro group is converted to the amino group by reduction. The second reaction sequence is then effected under the same conditions as the first reaction sequence. The reaction products may be isolated from their solutions or suspensions by precipitation with a salt, e.g. sodium chloride, and/or an acid, filtering, washing with a salt solution and drying.

The compounds of Formula I produced in this way which contain, depending on the relative amounts of benzene and chlorobenzene used as starting material, a more or less high proportion of the corresponding symmetric bis-triazinylaminostilbene, are suitable for brightening natural or synthetic polyamide fibres, or fibres of natural or regenerated cellulose, or paper.

In comparison with known ditriazinyldiaminostilbenedisulphonic acid derivatives the compounds of Formula I are characterized by an adsorbability which is to a large extent independent of the temperature. The compounds of Formula I are well adsorbed on to textile materials from cold or hot washing agent liquors, especially on to cellulose. In comparison with corresponding chlorine-free symmetric ditriazinyldiaminostilbenedisulphonic acid derivatives the compounds of Formula I are characterized by an increased adsorption power on polyamide fibres and a better adsorption power at an elevated temperature on cellulose, while in comparison with analogous compounds in which both X represent chlorine atoms, the compounds of Formula I give more brilliant brightening at a low temperature, i.e. at 20.30° C., especially in washing agent liquors.

In the following examples the parts and percentages are by weight and the temperatures are stated in degrees centigrade.

EXAMPLE 1

A solution of 194 parts of cyanuric chloride in 1000 parts of acetone is allowed to run into 2000 parts of ice water while stirring well. A solution of 207 parts of sodium - 4,4′-diaminostilbene-2,2′-disulphonate in 1500 parts of water is allowed to run into the resulting fine suspension of cyanuric chloride during 30 minutes at 0° to 5°. 530 parts of a 10% sodium carbonate solution are added during the course of 30 minutes, whereafter the diaz test should no longer show any free amino group. The resulting sodium-4,4′-bis-[4″,6″-dichloro-1″,3″,5″-triazinyl-2″-amino]-stilbene-2,2′-disulphonate is precipitated in finely divided form.

A solution of 46.5 parts of aminobenzene in 100 parts of acetone is allowed to run in during about 30 minutes and 265 parts of a 10% sodium carbonate solution are added dropwise during about 15 minutes, thereafter 65 parts of 4-chloro-1-aminobenzene in 250 parts of acetone are added, the mixture is simultaneously heated to 40° and heating is effected for a few hours at 40–50° while gradually adding 265 parts of a 10% sodium carbonate solution. Thereupon 67 parts of β-hydroxyethylamine in the form of a 20% aqueous solution are added. The temperature is increased to 90° to 95°, whereby acetone distills off. During 3 hours 530 parts of a 10% sodium carbonate solution are stirred in; the reaction mixture is diluted with 8000 parts of water and the reaction product is precipitated by salting out with 1400 parts of sodium chloride, filtered with suction, washed with sodium chloride solution and dried at 60°. It constitutes a light yellow solid substance which is pulverizable.

In place of sodium carbonate a corresponding quantity of potassium carbonate can be used as the acid binding agent with equally good effect.

EXAMPLE 2

When the 67 parts of β-hydroxyethylamine in Example 1 are replaced with 83 parts of N-methyl-N-β-hydroxyethylamine, a very similar product is obtained; the same applies when, instead of the 67 parts of β-hydroxyethylamine, 96 parts of morpholine are used.

EXAMPLE 3

A suspension of 414 parts of sodium-4,4′-bis-(4″,6″-dichloro - 1″,3″,5″-triazinyl-2″-amino) - stilbene - 2,2′-disulphonate and 31 parts of methylamine in the form of a 25% aqueous solution are added to the suspension produced according to Example 1, stirring at 40° is effected for a few hours with the addition of 530 parts of a 10% sodium carbonate solution, a solution of 65 parts of aminobenzene hydrochloride and 85 parts of 4-chloro-1-aminobenzene hydrochloride and 20 parts of concentrated hydrochloric acid in 500 parts of water are added, and heating is effected for a few hours to 90° while gradually stirring in 920 parts of a 10% sodium hydroxide solution. After diluting with hot water, the reaction product is salted out with sodium chloride, filtering is effected and drying. The product is a light yellow powder.

EXAMPLE 4

At 0° to 5° 61 parts of β-hydroxyethylamine are added during 30 minutes to a suspension of 184 parts of cyanuric chloride in 2000 parts of water. Thereafter 400 parts of a 10% sodium hydroxide solution are added during the course of 30 minutes. Thereafter a solution of 207 parts of the sodium salt of 4,4′-diaminostilbene-2,2′-disulphonic acid in 1500 parts of water is quickly added. While gradually adding a 10% sodium hydroxide solution stirring is effected at 40° until primary amino group is no longer detectable. Finally a solution of 65 parts of aminobenzene hydrochloride and 85 parts of 4-chloro-1-aminobenzene hydrochloride and 20 parts of concentrated hydrochloric acid in 500 parts of water are added and the mixture is heated for 3–4 hours to 90° while gradually adding 920 parts of a 10% sodium hydroxide solution. The reaction product is obtained in the form of a light yellow powder by salting out, filtering with suction, washing with a sodium chloride solution, drying and grinding.

When in this example the 65 parts of aminobenzene hydrochloride and 85 parts of 4-chloro-1-aminobenzene hydrochloride are replaced with 55 parts of aminobenzene hydrochloride and 100 parts of 4-chloro-1-aminobenzene hydrochloride, or by 80 parts of aminobenzene hydrochloride and 70 parts of 4-chloro-1-aminobenzene hydrochloride, equally good products are obtained.

Similar compounds are obtained when 2- or 3-chloro-1-aminobenzene are used instead of 4-chloro-1-aminobenzene.

EXAMPLE 5

A solution of 37 parts of cyanuric chloride in 1000 parts of acetone is allowed to run into 400 parts of ice water while stirring well. A solution neutralized with sodium hydroxide of 80 parts of 4-nitro-4′-aminostilbene-2,2′-disulphonic acid in 800 parts of water is added dropwise at 0–5° while stirring to the resulting fine suspension during about 10 minutes. Thereupon a solution of 11 parts of sodium carbonate in 100 parts of water is allowed to run in during 1 hour in such a way that the reaction mixture maintains a weakly acid to neutral reaction. 16 parts of an aqueous 40% dimethylamine solution are then added to the resulting neutral mixture which has been freed of starting material, the temperature is raised during about 1 hour to 35° and stirring at this temperature is effected for 3 hours. The resulting hydrochloric acid is neutralized during this time by gradually adding a solution of 11 parts of sodium carbonate in 100 parts of water. 25 parts of aminobenzene are then added to the reaction mixture, the temperature is raised to 80–90° and stirring at this temperature is effected for about 6 hours while gradually adding a 10% sodium carbonate solution so as to maintain the pH value at 6–7. After cooling, the resulting condensation product is separated by the addition of sodium chloride, filtering with suction is effected and the precipitate washed with sodium chloride solution. The product, after it has been washed neutral, is then mixed, during 1 hour at 90 to 100°, into a reduction solution consisting of 1000 parts of water. 130 parts of iron filings and 30 parts of glacial acetic acid. As soon as the nitro compound has disappeared, the solution is made alkaline with sodium carbonate, filtered and the resulting amino compound is separated from the filtrate with dilute hydrochloric acid, filtering is effected, washing with water until neutral and drying. 57 parts of the resulting product are taken up in water, made neutral with sodium carbonate and the resulting solution is added dropwise during 10 minutes at 0 to 10° to a suspension which has resulted by mixing 18.5 parts of cyanuric chloride dissolved in 100 parts of acetone with 100 parts of ice and 100 parts of water. The resulting hydrochloric acid is neutralized by gradually adding a solution of 5.5 parts of sodium carbonate in 50 parts of water. Thereupon 8 parts of an aqueous 40% dimethylamine solution are added, the temperature is raised during about 1 hour to 30° and stirring for 4 hours at that temperature is effected. The resulting hydrochloric acid is neutralized by the gradual addition of a solution of 5.5 parts of sodium carbonate in 50 parts of water. 20 parts of 4-chloro-1-aminobenzene hydrochloride in 180 parts of water are then added to the reaction mixture, the temperature is raised to 90°, whereby the acetone distils off, and the mixture is kept for several hours at 90–95° while gradually adding a 30% sodium hydroxide solution in order to maintain the pH value at about 7. After the addition of sodium chloride, cooling to room temperature is effected, the separated condensation product is filtered off, washed with sodium chloride solution and dried. The resulting product is a yellow powder which is soluble in water.

When the dimethylamine used in the above two reaction sequences is replaced with the corresponding amount of monomethylamine, β-hydroxyethylamine or N-methyl-N-β-hydroxyethylamine, very similar products result.

EXAMPLE 6

0.1% of the brightening agent of Example 1 is worked in manner known per se into a washing powder which, in addition to 50% of soap, contains the other usual constituents, e.g. complex forming phosphates, soda and alkali metal silicates. Textiles of cotton or linen are washed with the resulting washing agent in the usual manner, suitably at temperatures of from 80 to 100°. The textiles then show an excellent white effect.

Using the same washing agent it is likewise possible to wash textiles of polyamide fibres in the usual way, suitably at temperatures up to 60°. In this case also, the textile materials are distinctly brightended, despite the wash liquor having a pH value of 10.

EXAMPLE 7

A fine washing agent which contains about 30% of synthetic washing agent (e.g. alkyl-aryl-sulphonates and/or fatty alcohol sulphonates), 5 to 10% of complex forming phosphates, 65 to 60% of Glauber salt as well as 0.3% of the brightening agent of Example 1, is used in the usual way for washing delicate materials of regenerated cellulose or polyamide fibres. The wash liquor obtained in this way has a pH value of 8. Insofar as the goods being washed are undyed, these are excellently brightened especially the regenerated cellulose articles. In the case of goods dyed in delicate pastel shades, the dye shade appears more brilliant.

Although the present invention is described herein with particular reference to specific details, it is not intended that such details shall be regarded as limitations upon the scope of the invention except insofar as included in the accompanying claims.

I claim:
1. An asymmetric bis-triazinylamino-stilbene of the Formula I

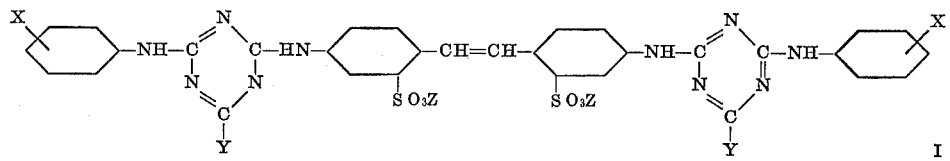

in which
one X signifies a hydrogen atom, and
the other X signifies a chlorine atom in the 4-position, Y signifies a N-methyl-N-β-hydroxyethylamino or morpholino radical, and
Z signifies an alkali metal.
2. The compound of claim 1 wherein each Y is the morpholino radical.
3. The compound of claim 1 wherein each Y is the N-methyl-N-β-hydroxyethylamino radical.

References Cited

FOREIGN PATENTS 471,114  5/1952  Italy _____ 260—240
528,445  7/1956  Canada _____ 260—240

JOHN D. RANDOLPH, Primary Examiner

U.S. Cl. X.R.

117—33.5; 252—110, 117; 260—247.5, 249.5, 249.8